United States Patent [19]

Costes et al.

[11] Patent Number: 4,630,267
[45] Date of Patent: Dec. 16, 1986

[54] PROGRAMMABLE TIMING AND SYNCHRONIZATION CIRCUIT FOR A TDMA COMMUNICATIONS CONTROLLER

[75] Inventors: Michel L. Costes, Cagnes/Mer, France; Gene D. Hodge, Brookville, Md.

[73] Assignee: International Business Machines Corporation, Armonk, N.Y.

[21] Appl. No.: 680,409

[22] Filed: Dec. 10, 1984

Related U.S. Application Data

[63] Continuation-in-part of Ser. No. 564,859, Dec. 23, 1983, abandoned.

[51] Int. Cl.$^4$ .............................................. H04J 3/06
[52] U.S. Cl. ................................................... 370/104
[58] Field of Search .................... 370/89, 95, 100, 103, 370/104; 375/107; 455/12, 51

[56] References Cited

U.S. PATENT DOCUMENTS

| | | | |
|---|---|---|---|
| 3,836,721 | 9/1974 | Sugioka | 375/107 |
| 3,858,007 | 12/1974 | Ganssmantel | 375/107 |
| 3,922,496 | 11/1975 | Gabbard et al. | 375/107 |
| 4,052,670 | 10/1977 | Watanabe et al. | 370/104 |
| 4,181,909 | 1/1980 | Pyeatte et al. | 375/107 |
| 4,218,654 | 8/1980 | Ogawa et al. | 375/107 |
| 4,262,356 | 4/1981 | Lautier et al. | 370/104 |
| 4,397,018 | 8/1983 | Fennel, Jr. et al. | 370/104 |
| 4,470,141 | 9/1984 | Takada | 370/104 |

FOREIGN PATENT DOCUMENTS

| | | | |
|---|---|---|---|
| 3202656 | 8/1982 | Fed. Rep. of Germany | 370/104 |
| 0141041 | 8/1983 | Japan | 370/104 |

OTHER PUBLICATIONS

"SS/TDMA Frame Synchronization", Campanella et al., 1981, I.C.C. Denver, Colo., USA, 14-8, Jun. 1981.
"TDM/TDMA Synchronization", Townley et al., IEEE Electronics and Aerospace Systems Convention (Eascon) Record, 1970.
"SS-TDMA Networking VIA ISL", T. Inukai, Conference: 1981, I.C.C., Denver, Colo. USA, 14–18, Jun. 1981.

Primary Examiner—Douglas W. Olms
Assistant Examiner—Kenneth I. Rokoff
Attorney, Agent, or Firm—John E. Hoel

[57] ABSTRACT

The disclosed circuit employs a single programmable timer and address decoder which identifies a plurality of bursts received from other stations in a TDMA communications network by means by identifying their origin addresses, and then starts associated timing intervals in the programmable timer for each burst. The instant when the intervals being timed terminate, corresponds approximately to the instant at which the local station should commence its transmission burst. The programmable timer and synchronizer associates each of a plurality of timing intervals with each of the plurality of transmitting stations in the TDMA network, and terminates each respective interval at approximately the same instant in a given local station, thus allowing the time for commencement of the local station's transmission burst to be reliably determined without regard for the participation of any more than one other of the plurality of transmitting stations in the TDMA network. This enables a TDMA communications system to be democratically synchronized in a reliable manner.

12 Claims, 8 Drawing Figures

| SYNC | UW | TRANSMITTING STATION'S ADDRESS | RECEIVING STATION'S ADDRESS | TRAFFIC |
|------|----|-------------------------------|-----------------------------|---------|

PROGRAMMABLE TIMING AND SYNCHRONIZATION CIRCUIT FOR A TDMA COMMUNICATIONS CONTROLLER

This application is a continuation-in-part of 06/564,859 filed Dec. 23, 1983, now abandoned.

FIELD OF THE INVENTION

The invention disclosed broadly relates to digital communications and more particularly relates to synchronization operations in a time domain multiple access communications network.

BACKGROUND OF THE INVENTION

Time domain multiple access communications networks employ links such as a commonly connected, time divided bus or alternately a time shared satellite transponder, to transmit time synchronized bursts of digital data which are time multiplexed without overlapping. For example, in time domain multiple access (TDMA) satellite communications networks, a plurality of radio stations communicate through an earth satellite repeater by transmitting time synchronized bursts of radio energy relative to the repeater and which receive a time multiplexed composite of bursts containing corresponding modulated information from the repeater. In TDMA operations, multiple ground stations associated with radio signaling nodes transmit bursts of time concentrated information signals on a shared carrier frequency spectrum and receive the same information signals after repetition by the satellite repeater on a shifted carrier frequency spectrum. Each ground station is assigned a particular time slot in a continuum of recurrent frames for transmission of its bursts and for the reception of its own bursts and the bursts of other stations. The bursts interleave at the satellite in close time formation without overlapping. Each earth station includes connections to incoming digital lines originating from terrestrial sources.

An example of such a system is described in U.S. Pat. No. 4,262,356 to Lautier, et al entitled "Method and System for Synchronizing a TDMA Communication Network Comprising a Satellite Equipped with Several Directional Beam Antennas Transmitting Signals at Various Frequencies," which is assigned to the IBM Corporation. The relative position of the earth stations and the satellite transponder for the TDMA communications network is illustrated in FIG. 1. Three earth stations A, B and C on the surface of the earth 40 communicate via the synchronous satellite transponder 45 which orbits at approximately 22,500 miles above the surface of the earth 40, in a geosynchronous orbit. A transmission 42 from one of the stations B, for example, is received by the satellite transponder 45 and retransmitted over paths 42, 44 and 46 to all three of the stations A, B and C. The Lautier, et al patent describes a peer or democratic communications network where the method of synchronization allows a given station to determine the time at which its bursts are to be transmitted by detecting the time of reception of bursts originating from the other stations. In any TDMA frame, each station transmits its burst during predetermined time intervals. Each burst has the format shown in FIG. 2 herein, where a unique word (UW) is followed by the address of the transmitting station. A receiving station, for example station A detects a unique word and then decodes the transmitting station's address which follows that unique word, for example the address of station B, and initiates a time associated with station B. This timer defines the appropriate interval $dT_{AB}$ which must elapse between the receipt of the address from station B and a start of station A's transmission of the next burst.

In normal operation, if all stations are transmitting, three unique words (UW) and three transmitting station address are detected within one TDMA frame duration. In such a system as is described by Lautier, et al, each station is equipped with as many timers as there are stations in the TDMA network so that each timer can be associated with a different TDMA station signal which is received at a particular station. Each respective timer at a given receiving station is started at the moment that the burst from the transmitting station is received and all of the timers at a station should complete the timing of their respective intervals substantially simultaneously, that instant of termination indicating the approximate time at which that station should commence its own transmission. This can be seen with reference to FIG. 4 herein, which is a waveform diagram of bursts which are transmitted and received in a TDMA network in accordance with the Lautier, et al patent. The waveform $T_{XA}$ corresponds to the transmission of the burst from station A. The waveform $T_{XB}$ corresponds to the burst transmitted from station B. The waveform $T_{XC}$ corresponds to the burst from station C. Since the satellite transponder is in geosynchronous orbit, the time of reception of the transmitted bursts at any one station is delayed with respect to the time of transmission. The waveform $R_{XA,B,C}$ represents the waveform of the received signals which are the composite bursts from station A, station B and station C. It is seen that the burst transmitted from station A starting at time $t_1$ is received for example at station A from the satellite transponder at the later time $t_2$. Such delays can be as long as 300 milliseconds. For ease of explanation, the delay between the reception and transmission of a given burst will be shown as a relatively small value with respect to the duration of the bursts themselves, however it should be understood that the delay between transmission and reception can be arbitrarily long and yet the operation of the invention disclosed herein will still remain effective.

FIG. 4 also shows the relative timing of three separate timers in station A, each timer corresponding to one of the three transmitting stations A, B or C. The first timer in station A corresponding to the transmissions from station A, corresponds to the waveform labeled $T_{AA}$ shown in FIG. 4. At the instant $t_2$ when the transmitted burst $T_{XA}$ from station A is received at station A, the timer $T_{AA}$ starts timing and continues for a duration $dT_{AA}$ until the instant $t_7$. In a similar manner, a second timer at station A represented by the waveform $T_{AB}$ starts timing at the time $t_4$ when the burst transmitted from station B at time $t_3$ is received at station A. The timer $T_{AB}$ starts at the instant $t_4$ and continues for a duration $dT_{AB}$ until the time $t_7$. In a similar manner, the third timer at station A represented by the waveform $T_{AC}$ corresponds to bursts originating from station C and starts at the instant $t_6$, the time of reception of the burst from station C. The timer $T_{AC}$ continues for a duration $dT_{AC}$ until the instant $t_7$. It is noted that all three timers at station A stop at the instant $t_7$. After a guard time $T_G$ at station A which commences at the instant $t_7$ and ends at the instant $t_8$, the transmission of a burst from station A commences, as is shown for the waveform $T_{XA}$, and continues until the instant $t_8'$. As is seen in FIG. 4, the operation of the three timers at station A continues in this fashion, with the simultaneous termination of the three timers at station A signifying the starting of the guard time $T_G$ after which station A's transmission burst begins.

The operation at station B is similar to that described for station A, except that the timers $T_{BB}$, $T_{BC}$ and $T_{BA}$, corresponding respectively to bursts received from transmitting stations B, C and A, respectively, all simultaneously terminate at the instant $t_{10}$. Following the guard time $T_G$ after the instant $t_{10}$, the transmission burst from station B commences at the instant $t_{11}$. The transmission of the burst from station A terminates before the commencement of the transmission of the burst from station B in order to insure that signals from the two respective stations will not overlap when they reach the satellite transponder 45.

The operation at station C is similar to that described for stations A and stations B, station C having three timers $T_{CC}$, $T_{CA}$ and $T_{CB}$ corresponding respectively to bursts received from stations C, A and B. The three timers at station C all terminate simultaneously at the time $t_{13}$, which starts the guard time $T_G$, after which the burst from station C is transmitted at time $t_{14}$. The bursts transmitted from station A and station B will have terminated prior to the commencement of the transmission of the burst $T_{XC}$ from station C, in order to insure that the bursts transmitted from the three stations do not overlap at the satellite transponder.

OBJECTS OF THE INVENTION

It is an object of the invention to provide an improved synchronization timer for a TDMA communications controller.

It is another object of the invention to provide an improved programmable timer for the synchronization mechanism of a TDMA communications controller.

It is a third object of the invention to provide a highly flexible means for timing and synchronizing a multiplicity of communications bursts in a TDMA communications controller.

SUMMARY OF THE INVENTION

These and other objects, features and advantages of the invention are accomplished by the timing and synchronization circuit disclosed herein. The inventive circuit employs a single programmable timer and address decoder which identifies a plurality of bursts received from other stations in a TDMA communications network by means of identifying their origin addresses, and then starts associated timing intervals in the programmable timer for each burst. The instant when the intervals being timed terminates, corresponds approximately to the instant at which the local station should commence its transmission burst. The programmable timer and synchronizer associates each of a plurality of timing intervals with each of the plurality of transmitting stations in the TDMA network, and terminates each respective interval at approximately the same instant in a given local station, thus allowing the time for commencement of the local station's transmission burst to be reliably determined without regard for the participation of any more than one other of the plurality of transmitting stations in the TDMA network. This enables a TDMA communications system to be democratically synchronized in a reliable manner.

When a burst is received at a local station from a given transmitting station, the programmable timer and synchronizer at the local station enables the transmitter's address corresponding to the burst to be used as the read address to a period memory which stores the respective durations for the intervals to be timed by the programmable timer. The stored interval corresponding to a received burst is added to the local instant of time and that sum is the final instant for the duration of the timed interval. That final instant value is then written into a final instant memory at a write address corresponding to the transmitter's address for the received TDMA burst. In this manner, there are as many final instant values written into the final instant memory as there are participating transmitting stations in the TDMA network.

As communications continue, the local time at the station is continually compared by the programmable timer and synchronizer with each of the final instant values in the final instant memory until a successful comparison is made. When that successful comparison is made, each of the final instant values being monitored by the timer should successfully compare with the current local time. If any one of the final instant values successfully compares with the local instant of time, the programmable timer and synchronizer starts the guard time interval for the local station. After the expiration of the guard time, the programmable timer and synchronizer controls the local station to begin to transmit its own burst. The instant of commencement and the duration of the guard time and the instant of commencement and the duration of the transmission bursts are controlled by the programmable timing and synchronization circuit in a manner similar to the monitoring of the intervals previously described.

DESCRIPTION OF THE FIGURES

These and other objects, features and advantages of the invention will be more fully appreciated with reference to the accompanying figures.

DISCUSSION OF THE PREFERRED EMBODIMENT

Figures 1, 2:
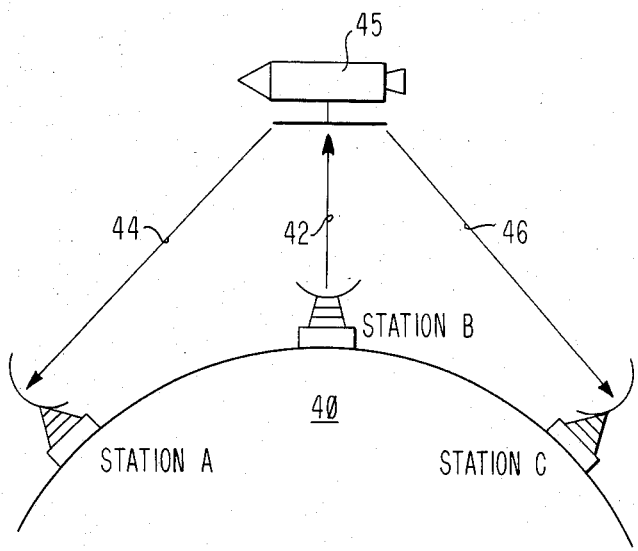
FIG. 1 illustrates the relative positioning of a satellite transponder with respect to the earth stations in a TDMA satellite communications network.
FIG. 2 illustrates the format of an example TDMA burst transmitted by a given station in the TDMA network.
Figure 3:
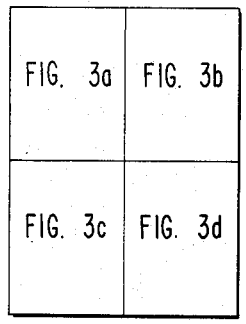
FIGS. 3 and 3a–d are a functional block diagram of the timing and synchronization circuit invention.
Figure 3A:
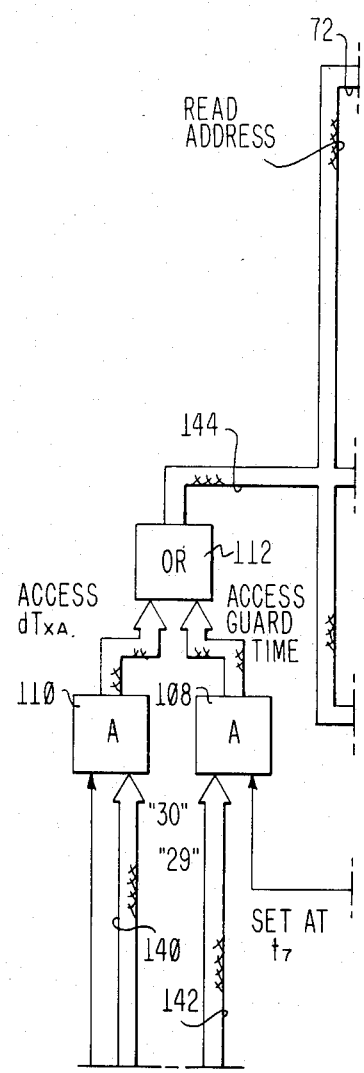
Figure 3B:
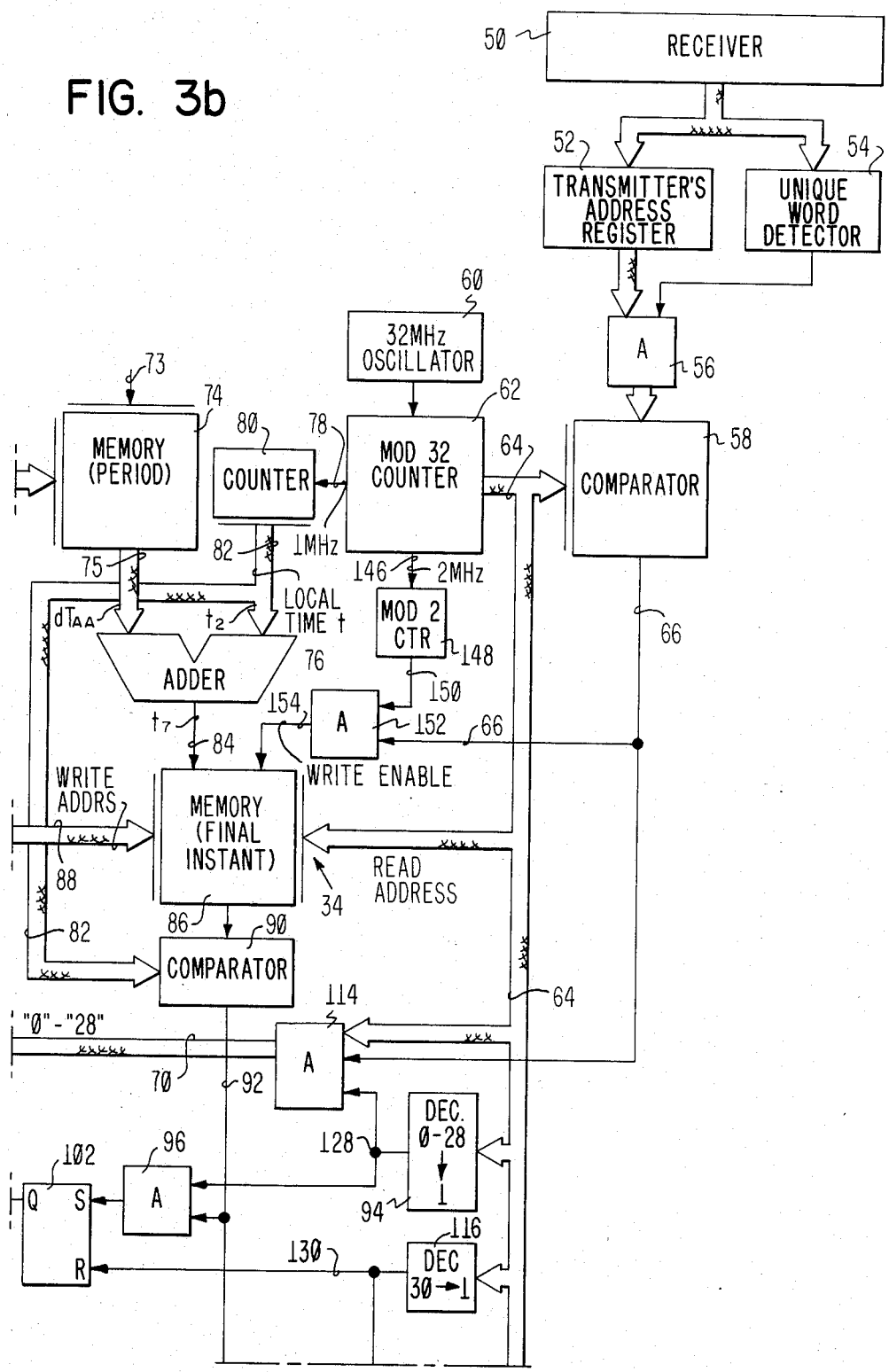
Figure 3C:
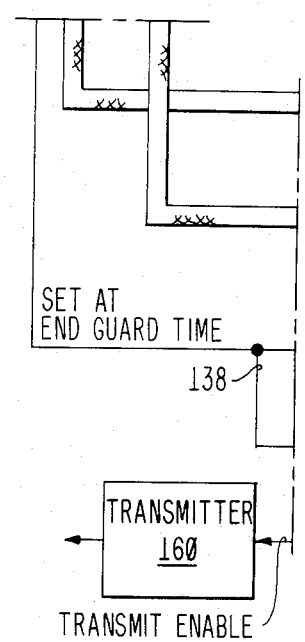
Figure 3D:
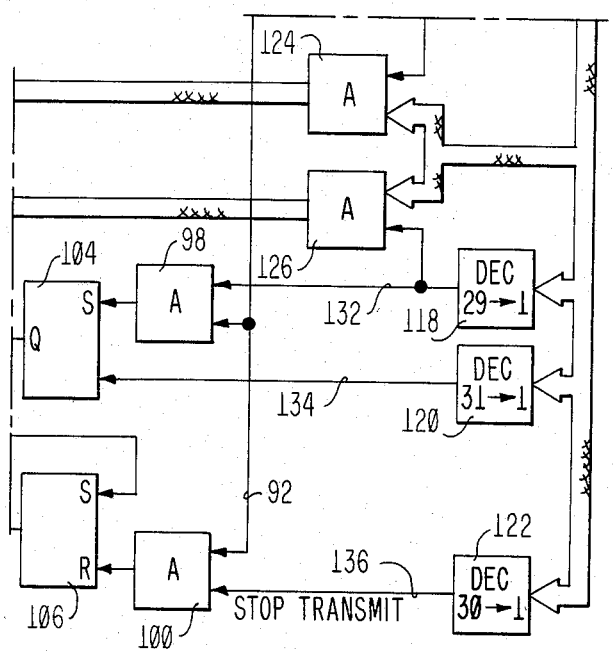

FIG. 3 shows a functional block diagram of the invention. Only the timing and synchronization circuit for station A will be described, the operation for the circuits at stations B and C being similar to that described for station A. The TDMA burst whose format is shown in FIG. 2, will be received at station A and after a receiving modem makes use of the synchronization portion (SYNC), the receiver 50 inputs the unique word (UW) into the unique word detector 54 and the transmitter's address from the transmitting station into the transmitter's address register 52. If the unique word detector 54 is satisfied that an actual unique word has been received, it will output an enabling signal to the AND gate 56 so that the transmitter's address stored in the transmitter's address register 52 will be output to one of the inputs of the comparator 58.

In the example described herein, a 32 MHz oscillator 60 will be employed to drive the programmable timer and synchronization circuit invention. However, other frequencies can be chosen for the oscillator 60 in order to accomplish the objects of the invention. It is contemplated that the TDMA network described herein with a 32 MHz oscillator 60, will support up to 29 earth stations. With the addition of timing slots for handing the transmission guard time, and other control timing needs, a total of 32 repetitive time slots are needed to support a 29 station network. Thus a modulo 32 counter 62 is driven by the 32 MHz oscillator 60 in order to provide 32 time slots per microsecond period for carrying out the operations of the programmable timer and synchronizer. The mod 32 counter 62 has an eight-bit output bus 64 which is connected to the second input of the comparator 58. Values of from zero through 31 are output on the bus 64 during each microsecond period interval. The values for the transmitter's address stored in the transmitter's address register 52 can range from zero through 28. Thus, when the unique word detector 54 has determined that a valid TDMA burst has been received from a station in the network, the comparator 58 will provide an output compare signal on the line 66 when the value output from mod 32 counter 62 on the bus 64 equals the transmitter's address stored in the register 52. The binary signal output on the line 66 is applied as one input to the AND gate 152 and one input to the AND gate 114.

Line 150 from the oscillator 60 is input to the AND gate 152. Thus, during the first half of each time slot (or address), no enabling signal is output on line 150 to the AND gate 152 and during the second half of each time slot, an enabling signal is applied over the line 150 to the AND gate 152. Thus, during the first half of each time slot, although a signal is present from the comparator 58 on the line 66, the AND gate 152 is not enabled and therefore the write enable signal 154 is not input to the final instant memory 86. Thus, in the first half of each time slot, the final instant memory 86 is in a read mode when an address is applied to its address input 34. During the second half of each time slot, the final instant memory 86 is in a write mode and will write the value present at its data input 84 into the location specified by the write address on input 88.

In this example, the operation of the circuit in FIG. 3 will be discussed with reference to the reception of the burst originally transmitted from station A. The transmitter's address value for the burst originating from station A can have a number assigned from zero through 28, and in this example the value of zero will be assigned. The decoder 94 will output an enabling signal on line 128 whenever a value of from zero through 28 is applied on the input bus 64 from the mod 32 counter 62. With an enabling signal being present on line 66 from the comparator 58 and an enabling signal being present on the line 128 from the decoder 94, the AND gate 114 will pass the numeric value of zero from the bus 64 over line 70 to the input 72 which is the read address input for the period memory 74. Table 1 shows the contents of the period memory 74. At the location corresponding to the read address value of zero in the period memory 74, the value $dT_{AA}$ corresponding to the duration for the interval of $T_{AA}$ in station A is stored. The application of the read address to the period memory 74 outputs the value $dT_{AA}$ over line 75 to the addend input of the adder 76.

The counter 80 is driven at a 1 MHz rate by the output 78 from the mod 32 counter 62. The counter 80 updates the local time $t_i$ every microsecond period at station A and the local time value is applied to the augend input of the adder 76. As can be seen with reference to FIG. 4, the burst received from the station A occurs at the instant $t_2$ and thus the value $t_2$ is applied to the augend input of the adder 76.

The sum output from the adder 76 is the value $t_7$ on line 84, which is the instant for the termination of the duration being timed by the interval $dT_{AA}$. During each write mode in the current one microsecond, the oscillator 60 applies an enabling signal on line 150 to the AND gate 152, which combines with the enabling signal on line 66 from the comparator 58 so as to provide a write enable signal on line 54 to the final instant memory 86. The numeric value of zero on line 70 from the AND gate 114 is applied over the write address input 88 to the final instant memory 86 so that the value of $t_7$ output on line 84 from the adder 76 is stored at the location in the final instant memory 86 corresponding to the write address value of zero.

Figure 4:
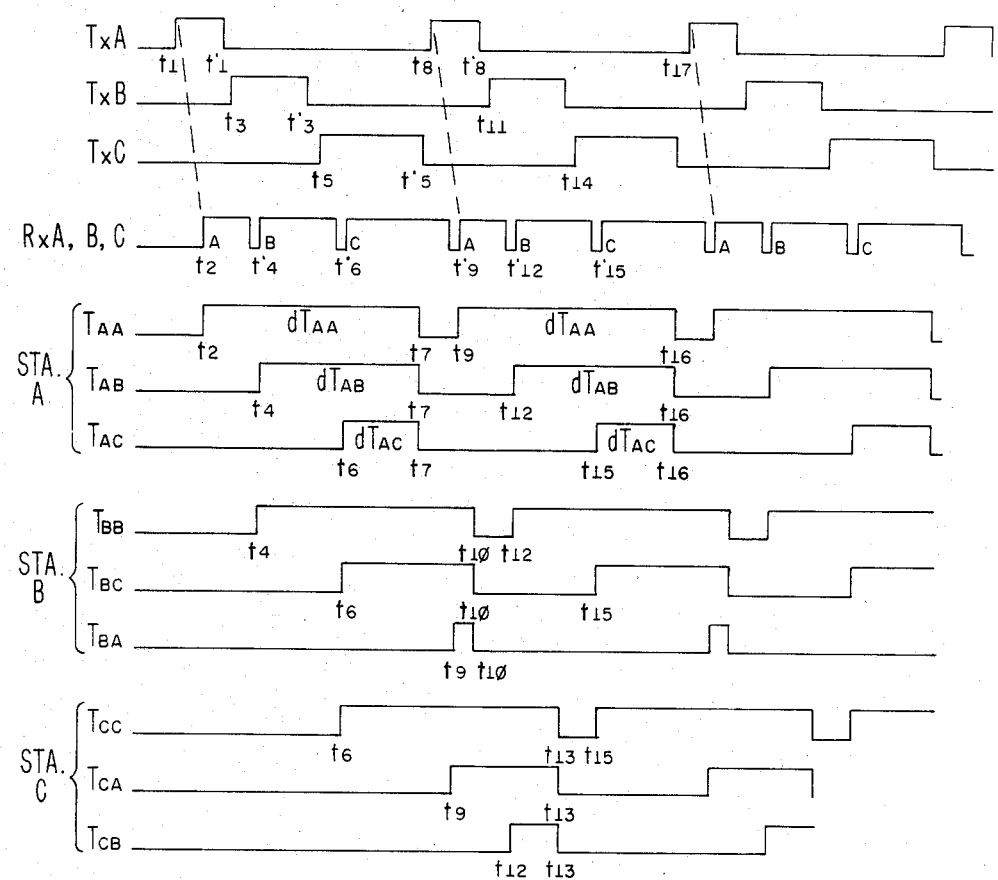
FIG. 4 is a timing diagram illustrating the operation at three respective stations A, B and C.

As each respective burst is received at station A from each respective transmitting station participating in the TDMA network, a similar operation is carried out of generating the terminating instant $t_7$ from each respective duration $dT_{AA}$, $dT_{AB}$, and $dT_{AC}$ as is shown in FIG. 4. These values $t_7$ are all stored in the final instant memory 86 as described for the reception of the burst from station A. The contents of the final instant memory 86 is shown in Table 2.

As communications continue in the TDMA network, the contents of the final instant memory 86 is periodically read out and compared with the local time value $t_i$, the comparison being performed in the comparator 90. The mode 32 counter 62 outputs the 32 values of from zero through 31 on the bus 64 during each one microsecond period, and all of those values are sequentially applied at the read address input 34 to the final instant memory 86. During each one microsecond period, a new value for the local time $t_i$ is output by the counter 80 over the line 82 and is applied to the comparator 90. At station A, when the instant $t_7$ for the local time finally arrives, this signifies the termination of each of the three intervals being timed, $dT_{AA}$, $dT_{AB}$, and $dT_{AC}$, respectively corresponding to the received bursts from stations A, B and C. For three transmitting stations participating in the TDMA network, three consecutive pulses will be output on the line 92 from the comparator 90 during the single one microsecond period at the instant $t_7$. Only one enabling pulse on line 92 is necessary to carry out the following sequence of operations for generating the guard time $T_G$ and the burst transmission duration $T_{XA}$ for station A.

At the instant $t_7$, line 92 applies a first enabling signal to the AND gate 96. The decoder 94, having received a value of from zero through 28 from the mod 32 counter 62, applies a second enabling signal on line 128 to the AND gate 96. The AND gate 96 then applies a set signal to the flip-flop 102. The flip-flop 102 has its Q output enabled, applying an enabling signal to one input of the AND gate 108. During the one microsecond period at $t_7$, when the value 29 is output from the mod 32 counter 62, the decoder 118 outputs an enabling signal on line 132 which enables the transmission of the value 29 to the other input of the AND gate 108. The value 29 is then passed through the AND gate 108, through the OR gate and 112 over the line 144 as a read address to the period memory 74. Reference to Table 1 will show that the value stored at the read address location 29 of the period memory 74 is $dT_G$ which is the duration of the guard time $T_G$. This value is output from the period memory 74 over line 75 to the addend input of the adder 76. It is added to the local time $t_i$ output from the counter 82, which is currently at the value $t_7$. The sum of these two values is output by the adder 76 on line 84 as the value $t_8$ and is stored at the location 29 of the final instant memory 86, the value of 29 being applied as the write address input on line 88 to the final instant memory 86, during each write mode in the one microsecond period at $t_7$. In the next time slot during the one microsecond period at $t_7$, the value 30 is output from the mod 32 counter 62, which causes the decoder 116 to output an enabling pulse on line 130 which resets the flip-flop 102.

As the guard time completes its assigned duration, values of the local time $t_i$ are applied to one input to the comparator 90 and when they are equal to the value $t_8$ output from the final instant memory 86, an enabling signal is output on line 92 to the AND gate 98. As the mod 32 counter 62 outputs a value of 29, the decoder 118 outputs an enabling signal on line 132 to the other input of the AND gate 98, thereby setting the flip-flop 104. The output of the flip-flop 104 at Q is applied over line 138 to enable the AND gate 110. The output 138 of the flip-flop 104 is also applied to the set input of the flip-flop 106, which signals the transmitter 160 to start the transmit burst for station A. As the mod 32 counter 62 next outputs a value of 30 over the bus 64, the decoder 116 outputs an enabling signal on line 130 which enables the AND gate 124 to that the value of 30 can pass over line 140 to the other input of the AND gate 110. The value of 30 is then applied through the OR gate 112 and over line 144 as the read address to the input 72 to the period memory 74. As is seen in Table 1, the value stored at the read address 30 for the period memory 74 is $dT_{XA}$, the duration of the transmission burst for station A. This duration value is added to the local time $t_i$ output by the counter 80 which is equal to $t_8$. The sum of these values is $t_8'$ which is stored in the final instant memory 86.

As the duration $dT_{XA}$ of the burst time for station A is completed, and the local time $t_8'$ occurs, the comparator 90 will be satisfied and will output an enabling signal on line 92 to the AND gate 100. As the value of 30 is output from the mod 32 counter 62 in the bus 64, the decoder 122 will apply an enabling signal on line 136 to the AND gate 100, which will output a reset signal to the flip-flop 106, thereby turning off the burst transmitter 160 for station A. This concludes the transmission of the burst from station A.

As can be seen from the above, one or more of the bursts transmitted from the several stations in the TDMA network could have been interrupted, and yet proper synchronization can be achieved for determining the commencement of transmission of the local station A's burst. Thus, by use of the programmable timing and synchronization circuit disclosed herein, TDMA synchronization can be reliably attained in a democratically synchronized communications network. The relative durations of the respective bursts from each of the stations participating in the TDMA network can be modified in a flexible manner by storing other duration values over line 73 into the period memory 74.

Although a particular embodiment of the invention has been disclosed, it will be understood by those of skill in the art that the foregoing and other changes in form and detail may be made therein without departing from the spirit and the scope of the invention.

TABLE 1

| Period Memory 74 | | |
| --- | --- | --- |
| 0 | $dT_{AA}$ | ($t_2$ to $t_7$) |
| 1 | $dT_{AB}$ | ($t_4$ to $t_7$) |
| 2 | $dT_{AC}$ | ($t_6$ to $t_7$) |
| . | . | |
| . | . | |
| . | . | |
| 28 | | |
| 29 | $dT_G$ | ($t_7$ to $t_8$) |
| 30 | $dT_{XA}$ | ($t_8$ to $t_8'$) |
| 31 | $dT_{sync}$ | ($t_8$ to $t_{16}$) |

TABLE 2

| Final Instant Memory 86 | |
| --- | --- |
| 0 | $t_7$ |
| 1 | $t_7$ |
| 2 | $t_7$ |
| . | . |
| . | . |
| . | . |
| 28 | |
| 29 | $t_8$ |
| 30 | $t_8'$ |
| 31 | $t_{16}$ |

We claim:

1. A programmable timing circuit, comprising:
a period memory for storing the value of the duration of intervals to be timed;
a final instant memory for storing values of the final instant for each of said intervals;
a local time counter for outputting values of instants of local time;
an adder having an augend input connected to an output of said period memory and an addend input connected to an output of said counter and a sum output connected to a data input of said final instant memory, for adding a duration value output from said period memory to an instant value output from said counter and outputting their sum as a final instant of said duration value therein, said sum being input to said final instant memory;
a comparator having a first input connected to an output from said final instant memory and a second input connected to an output from said counter, for comparing said final instant values with said local time instant values and outputting a timing signal when the values are equivalent.

2. The apparatus of claim 1, which further comprises:
an event detector, for detecting the occurrence of each of a plurality of events and outputting a distinctive address value corresponding to each of said types of events when detected thereby;
said period memory having a read address input connected to said event detector, for accessing one of said duration values stored therein corresponding to a detected event, in response to a corresponding one of said distinctive addresses output from said detector upon detecting said event.

3. The apparatus of claim 2, which further comprises:
said final instant memory having a write address input connected to said event detector, for writing said final instant value therein corresponding to said detected event, in response to said corresponding one of said distinctive addresses output from said detector upon detecting said event.

4. The apparatus of claim 3, which further comprises: said final instant memory having a read address input connected to said output of said counter, for accessing said final instant values for comparison with said local time in said comparator.

5. The apparatus of claim 4, wherein said event is the receipt of a TDMA burst having an address as said distinctive address associated therewith, said comparator outputting said timing signal after a duration equal to said duration value stored in said period memory corresponding thereto.

6. A programmable timing circuit for a time division multiple access (TDMA) controller, comprising:
a period memory for storing the value of the duration of intervals to be timed following the receipt of TDMA bursts;
a final instant memory for storing values of the final instant for each of said intervals;
a local time counter for outputting values of instants of local time at said controller;
an adder having an augend input connected to an output of said period memory and an addend input connected to an output of said counter and a sum output connected to a data input of said final instant memory, for adding a duration value output from said period memory to an instant value output from said counter and outputting their sum as a final instant of said duration value therein, said sum being input to said final instant memory;
a comparator having a first input connected to an output from said final instant memory and a second input connected to an output from said counter, for comparing said final instant values with said local time instant values and outputting a TDMA synchronizing signal when the values are equivalent.

7. The apparatus of claim 6, which further comprises:
a TDMA burst detector, for detecting the reception of each of a plurality of TDMA bursts and outputting a distinctive address value corresponding to each of said TDMA bursts when detected thereby;
said period memory having a read address input connected to said burst detector, for accessing one of said duration values stored therein corresponding to a detector burst, in response to a corresponding one of said distinctive addresses output from said detector upon detecting said burst.

8. The apparatus of claim 7, which further comprises:
said final instant memory having a write address input connected to said burst detector, for writing said final instant value therein corresponding to said detected burst, in response to said corresponding one of said distinctive addresses output from said detector upon detecting said burst.

9. The apparatus of claim 8, which further comprises:
said final instant memory having a read address input connected to said output of said counter, for accessing said final instant values for comparison with said local time in said comparator.

10. The apparatus of claim 9, wherein said comparator outputs said timing signal after a duration equal to said duration value stored in said period memory corresponding thereto;
said timing signal being applied to a TDMA burst transmitter at said local station.

11. A programmable timing circuit for a time division multiple access (TDMA) controller, comprising:
a period memory for storing the value of the duration of intervals to be timed following the receipt of TDMA bursts;
a final instant memory for storing values of the final instant for each of said intervals;
a local time counter for outputting values of instants of local time at said controller;
an adder having an augend input connected to an output of said period memory and an addend input connected to an output of said counter and a sum output connected to a data input of said final instant memory, for adding a duration value output from said period memory to an instant value output from said counter and outputting their sum as a final instant of said duration value therein, said sum being input to said final instant memory;
a comparator having a first input connected to an output from said final instant memory and a second input connected to an output from said counter, for comparing said final instant values with said local time instant values and outputting a TDMA synchronizing signal when the values are equivalent;
a TDMA burst detector, for detecting the reception of each of a plurality of TDMA bursts and outputting a distinctive address value corresponding to each of said TDMA bursts when detected thereby;
said period memory having a read address input connected to said burst detector, for accessing one of said duration values stored therein corresponding to a detected burst, in response to a corresponding one of said distinctive addresses output from said detector upon detecting said burst;
said final instant memory having a write address input connected to said burst detector, for writing said final instant value therein corresponding to said detected burst, in response to said corresponding one of said distinctive addresses output from said detector upon detecting said burst;
said final instant memory having a read address input connected to said output of said counter, for accessing said final instant values for comparison with said local time in said comparator;
said comparator outputting said timing signal after a duration equal to said duration value stored in said period memory corresponding thereto;
said timing signal being applied to a TDMA burst transmitter at said local station.

12. In a TDMA satellite communications network having N stations, each respectively transmitting one burst per periodic frame interval through a satellite transponder to all of said N stations, each respective burst including the identity of the transmitting station, apparatus for synchronizing the transmission of bursts from a local one of said stations, comprising:
a mod M counter having an input connected to an M times F frequency oscillator, to generate M address values per M/F seconds, where M is greater than or equal to N+3;
a TDMA burst detector, for detecting the reception of each of a plurality of TDMA bursts transmitted from at least a portion of said stations and outputting said identity of the transmitting station whose burst is detected thereby;
a first comparator having a first input connected to said TDMA burst detector and a second input connected to said mod M counter, for generating an enabling signal when the address value output by said counter equals said identity of said transmitting station;

a period memory having an address input connected to said mod M counter and to said first comparator, for storing a guard duration value, a transmit duration value and a plurality of N receive duration values for the duration of intervals to be timed following the receipt of respective TDMA bursts from each of said N stations, said duration values being accessed by respective ones of said address values output from said counter;

a local time counter having an input connected to said mod M counter, for periodically generating a value for the instant of local time once every M/F seconds;

a final instant memory having an address input connected to said mod M counter and to said first comparator, for storing a guard final instant value, a transmit final instant value and a plurality of N receive final instant values for each of said intervals to be timed, said final instant values being accessed by respective ones of said address values output from said mod M counter;

an adder having an augend input connected to an output of said period memory and an addend input connected to an output of said local time counter and a sum output connected to a data input of said final instant memory, for adding a duration value output from said period memory to an instant value output from said local time counter and outputting their sum as a final instant of said duration value therein, said sum being input to said final instant memory;

a second comparator having a first input connected to said final instant memory and a second input connected to said local time counter, for periodically comparing said final instant values accessed from said final instant memory with said local time instant values and outputting an enabling signal;

first gating means connected between said mod M counter and said address input of said period memory, and having a control input connected to said first comparator, for applying a first address value output from said mod M counter to access a first one of said receive duration values which is then output from said period memory to said adder for addition with a local time value output by said local time counter, said adder then outputting the sum thereof as a first receive final instant value which is stored in said final instant memory at a location accessed by said first address value;

second gating means connected between said mod M counter and said address input of said period memory, and having a control input connected to said second comparator, for applying a second address value output from said mod M counter to access said guard duration value in response to said second comparator determining that said first receive final instant value equals the current value for the instant of local time, said guard duration value then being output from said period memory to said adder for addition with said current value of local time, said adder then outputting the sum thereof as a computed guard final instant value which is stored in said final instant memory at a location accessed by said second address value;

a third gating means connected between said mod M counter and said address input of said period memory, and having a control input connected to said second comparator, and a control output connected to a TDMA burst transmitter, for applying a third address value output from said mod M counter to access said transmit duration value in response to said second comparator making a second determination that said computed guard final instant value equals the current value for the instant of local time, said transmit duration value then being output from said period memory to said adder for addition with said duration value of local time, said adder then outputting the sum thereof as a computed transmit final instant value which is stored in said final instant memory at a location accessed by said third address value, said TDMA burst transmitter being turned on in response to said second comparator making said second determination;

a fourth gating means connected between said mod M counter and said TDMA burst transmitter, and having a control input connected to said second comparator, for turning off said transmitter in response to said second comparator determining that said computed transmit final instant value equals the current value for the instant of local time.

* * * * *

UNITED STATES PATENT AND TRADEMARK OFFICE
CERTIFICATE OF CORRECTION

PATENT NO. : 4,630,267
DATED : December 16, 1986
INVENTOR(S) : Michel L. Costes, et al.

It is certified that error appears in the above-identified patent and that said Letters Patent is hereby corrected as shown below:

IN THE CLAIMS:

Claim 7, col. 9, line 48 - The phrase "detector burst" should be "detected burst".

Claim 12, col. 12, line 33 - The phrase "duration value" should be "current value".

These mistakes are PTO mistakes.

Signed and Sealed this

Thirty-first Day of March, 1987

Attest:

DONALD J. QUIGG

Attesting Officer     Commissioner of Patents and Trademarks